3,605,927
POWERED ENDLESS TRACK VEHICLE
David L. Wells, 1813 Cottonwoods Road,
Carrollton, Tex. 75006
Filed Sept. 17, 1969, Ser. No. 858,775
Int. Cl. B62m 27/02
U.S. Cl. 180—5R
2 Claims

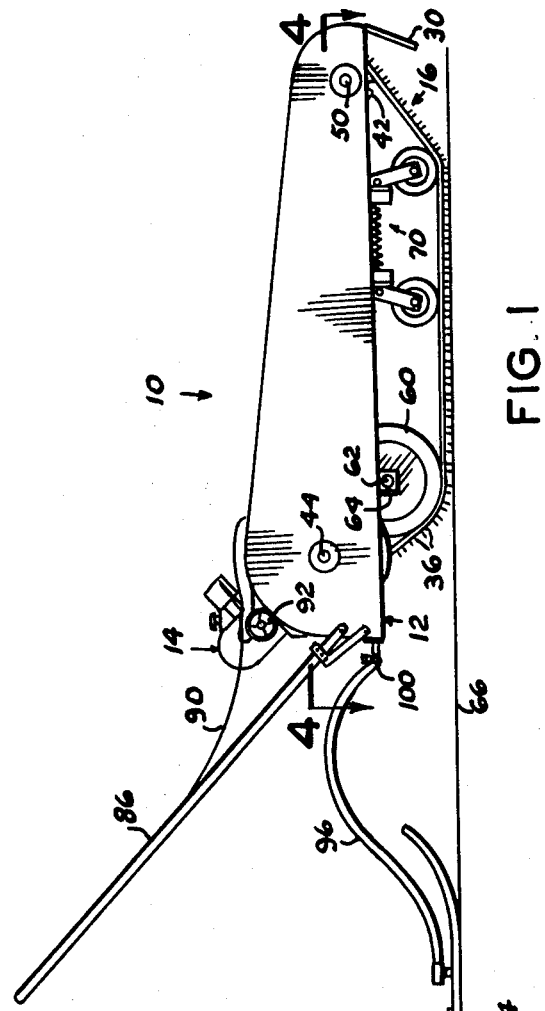
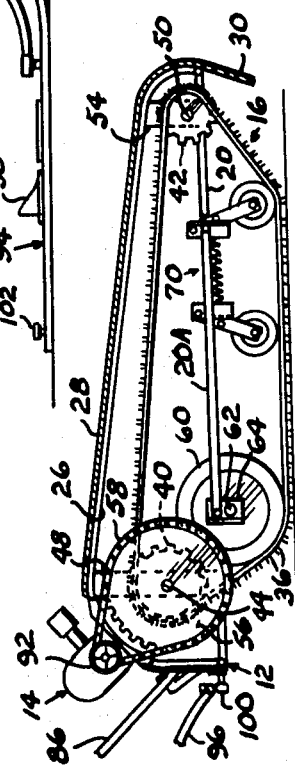
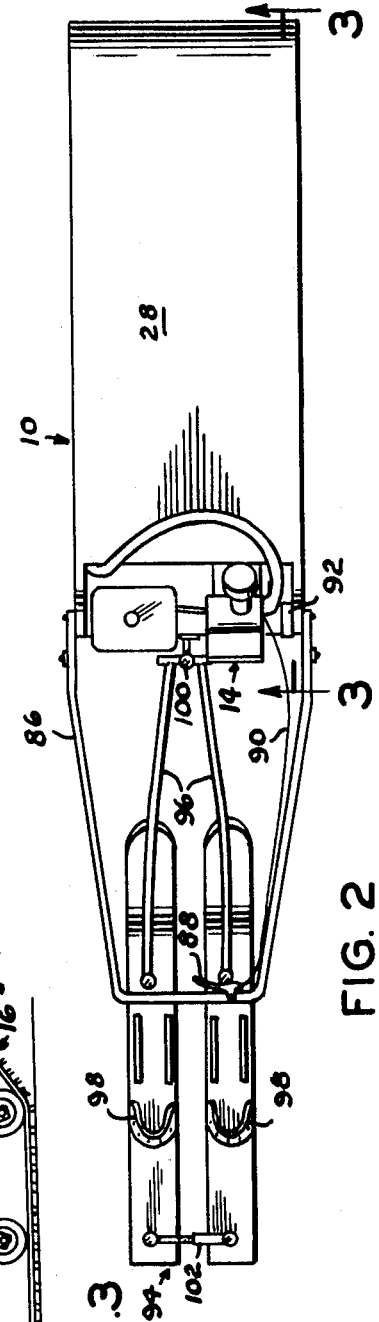
FIG. 1
FIG. 2
FIG. 3
DAVID L. WELLS
INVENTOR.
BY
Robert K. Rhea
AGENT Sept. 20, 1971  D. L. WELLS  3,605,927
POWERED ENDLESS TRACK VEHICLE
Filed Sept. 17, 1969  2 Sheets-Sheet 2
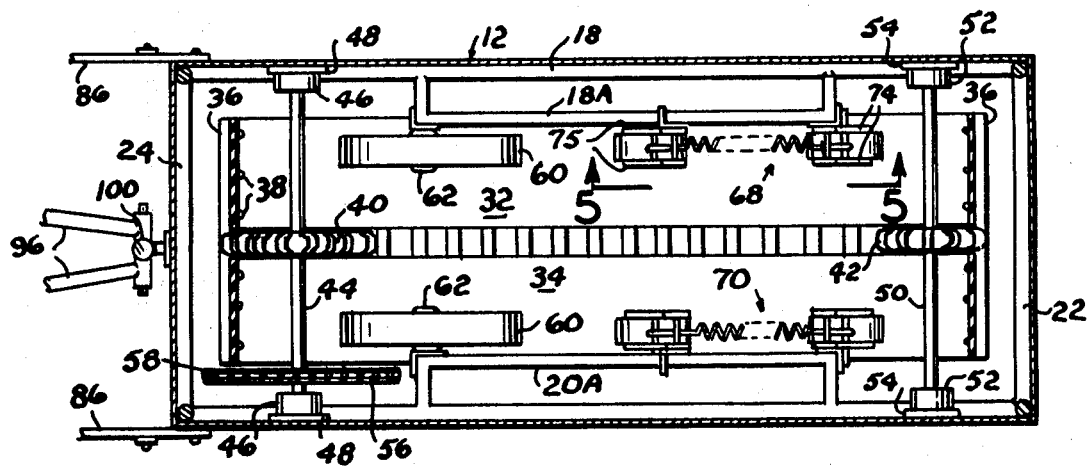
FIG. 4
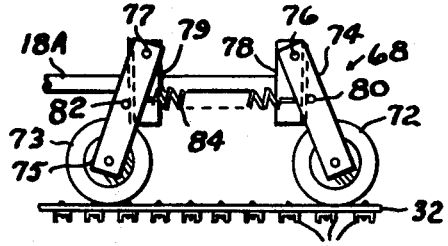
FIG. 5
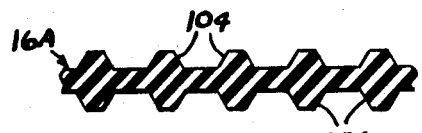
FIG. 9
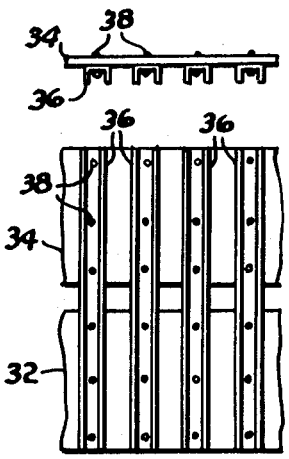
FIG. 6
FIG. 7
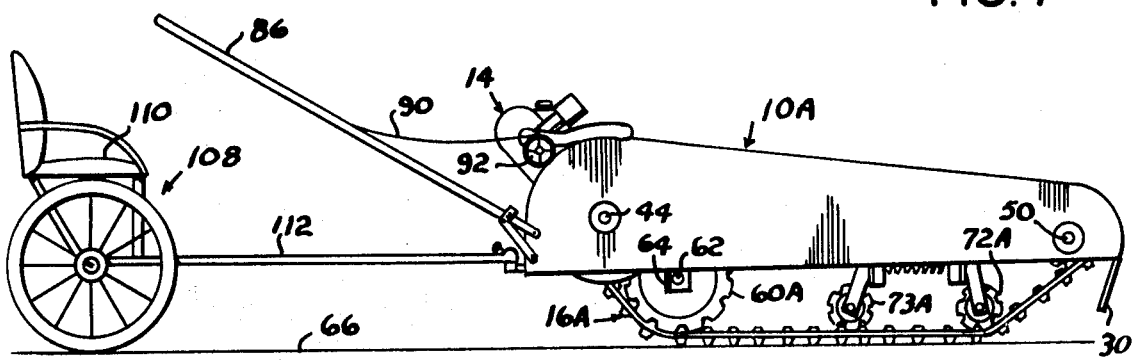
FIG. 8
DAVID L. WELLS
INVENTOR.
BY
Robert K. Rhea
AGENT United States Patent Office 3,605,927
Patented Sept. 20, 1971

ABSTRACT OF THE DISCLOSURE

A frame transversely journals sprockets and wheels around which an endless track is entrained and engaged by the sprockets for movement of the track. One of the sprockets is driven by a motor mounted on the frame. Means, connected with the frame in trailer-like fashion, transports the user. Handle control means, connected with the frame, projects rearwardly thereof toward the operator.

BACKGROUND OF THE INVENTION (1) Field of the invention

The present invention relates to land traveling vehicles and more particularly to an endless track vehicle for towing an operator across a snow field or other terrain.

The present invention is intended primarily for use by skiers in traveling across a snow field. It is essential that prime movers, for use in skiing areas or on snow fields, be compact and easily maneuverable and as narrow as possible in order to pass between close set objects, such as trees or rocks. Furthermore, such a device must be easily controlled and arranged for automatically disconnecting the clutch or drive in the event of upset or other emergency.

(2) Description of the prior art

The most pertinent prior art patents of which I am aware are disclosed by Pat. Nos. 2,289,768; 2,345,496 and 3,146,840. Some of the problems disclosed by the prior art in this type of vehicle have been means for steering and maintaining a proper tension on the endless track.

This invention solves the steeering problem by construction of the vehicle so that its center of gravity will be at its rearward end portion so that the handle may be used by the operator to pivot the forward end of the vehicle about the center of gravity. Springs, connected between pairs of pivotally mounted wheels, engaging the endless track, maintain a desired tension on the track.

SUMMARY OF THE INVENTION

A rectangular frame transversely pournals, at its respective ends, a pair of sprockets around which an endless track is entrained. Wheels, journalled by the frame, project below the frame in contact with the inner surface of the endless track for supporting the frame in spaced relation with respect to the surface of the earth. Springs, connected with spaced-apart pairs of wheels, maintain the endless track under tension. A motor, mounted on the rearward end of the frame, is drivably connected with one of the sprockets for propelling the track. Handle and engine control means is connected with the rearward end of the frame and operator transporting means is connected with the rearward end of the frame in trailer-like fashion.

The principal object is to provide a powered endless track compact lightweight vehicle for transporting an operator across the surface of the earth.

BRIEF DESCRIPTION OF THE DRAWINGS

FIG. 1 is a side elevational view of the skimobile embodiment of the device;

FIG. 2 is a top view of FIG. 1;

FIG. 3 is a vertical cross-sectional view, partially in elevation, taken substantially along the line 3—3 of FIG. 2;

FIG. 4 is a horizontal cross-sectional view, to a larger scale, partially in elevation, taken substantially along the line 4—4 of FIG. 1;

FIG. 5 is a fragmentary elevational view, partially in section, looking in the direction of the arrows 5—5 of FIG. 4;

FIG. 6 is a fragmentary side elevational view, to a further enlarged scale, of the endless track;

FIG. 7 is a bottom view of FIG. 6;

FIG. 8 is a side elevational view of an alternative embodiment of the device; and, FIG. 9 is a fragmentary vertical cross-sectional view of an alternative form of the endless track.

DESCRIPTION OF THE PREFERRED
EMBODIMENT

Like characters of reference designate like parts in those figures of the drawings in which they occur.

In the drawings:

The reference numeral 10 indicates the device, as a whole, comprising a frame 12 having an engine 14 mounted thereon and connected with endless track means 16. The frame 12 is generally rectangular and includes side members 18 and 20 integrally joined to forward and rearward end members 22 and 24. The frame 12 further includes upper side members 26, only one being shown (FIG. 3), connected with the respective ends of the side members 18 and 20 which supports a housing or cover 28 including depending side and end walls terminating in the horizontal plane of the frame 12 with the exception at the forward end of the device where the forward end portion of the cover extends downwardly below the horizontal plane of the frame to form a shield 30.

The track means 16 comprises a pair of endless belts 32 and 34 (FIGS. 4 and 7) which are connected in parallel spaced-apart relation by a plurality of transversely extending channel member cleats 36. Bolts or rivets 38 connect the cleats to the belts. The lateral spacing between the belts and the spacing between the cleats 36 is such that they may be cooperatively received by a driving cog wheel or sprocket 40 mounted in the rearward end portion of the frame and an idling cog wheel or sprocket 42 mounted in the forward portion of the frame. The driving sprocket 40 is supported by a shaft or axle 44 extending transversely of the frame and supported at its respective ends by bearings 46 in turn connected with supports 48 extending vertically between and connected with the respective frame side members 18–26 and 20–26. The idling sprocket 42 is similarly mounted centrally of the forward end portion of the frame by an axle 50 supported by bearings 52 connected with vertical supports 54 similarly supported by the frame side members. One end of the driving axle 44 has a chain sprocket 56 connected thereto. An endless chain 58 is entrained around the engine drive shaft and the chain sprocket 56 for rotating the driving axle 44 and propelling the track.

A pair of support wheels 60 are journalled for rotation on stub axles 62 connected with frame support members 64 at the rearward end portion of the frame, forwardly of the axle 44, for contacting the inner surface of the respective belts 32 and 34 on opposite sides of the spacing therebetween and supporting the frame in spaced relation with respect to the surface of the earth, indicated by the line 66. The wheel supports 64 are connected with and depend from innerframe members 18A and 20A parallel with and connected to the respective lower frame side member 18 and 20.

Two pairs of spaced-apart idling wheels or rollers 68 and 70 are connected in parallel spaced relation to the innerframe members 18A and 20A, respectively, forwardly of the wheels 60. The pairs of idling rollers 68 and 70 are mirror images of each other and only the pair of rollers 68 are described in detail. The idling rollers comprise forward and rearward rollers or wheels 72 and 73 axially journaled between the depending end portion of parallel strap iron members 74 and 75 pivotally supported at their upper end portions by bolts 76 and 77, or the like, extending through angle iron supports 78 and 79, vertically connected intermediate their ends to the interior frame side member 18A. Pins 80 and 82, extending through each pair of wheel supporting straps 74 and 75 intermediate their ends receive the respective ends of a tension spring 84 permitting movement of the rollers 72 and 73 toward and away from each other in response to the mass of the device and tension of the track so that these pairs of rollers 68 and 70 form a track tension means wherein the springs 84, tending to pull the rollers 72 and 73 toward each other, compensate for looseness of the track. Movement of the rollers 72 and 73 toward each other is limited by the pins 80 and 82 which are extended laterally outward of the outermost wheel supporting straps 74 and 75 so that the free end portion of each pin 80 and 82 contacts a respective forward and rearward surface of the roller supports 78 and 79.

A substantially U-shaped handle 86 is connected by its leg end portions to respective sides of the rearward end portion of the frame. The handle includes a throttle 88 and control cable 90 connected with the engine carburetor for controlling the speed of the engine 14. The engine 14 includes a conventional centrifugal clutch 92 as a safety feature wherein the centrifugal clutch releases and interrupts the driving connection between the engine and the sprocket chain 58 in the event the device 10 is upset and the engine is permitted to race.

In the embodiment illustrated in FIGS. 1 and 2, a pair of skis 94 are connected in parallel spaced relation to the device 10 by a pair of tongues 96 pivotally connected at their rearward end portions for horizontal pivoting movement to the respective ski forwardly of the operator's shoe receiving socket 98. The tongues 96 are pivotally connected for vertical pivoting and horizontal rotating movement to the rearward end surface of the frame by connecting means 100. The rearward end portion of the skis 94 are interconnected by a turnbuckle-like member 102 for maintaining the rearward end portion of the skis in parallel spaced relation.

Referring now more particularly to FIGS. 8 and 9, an alternative embodiment of the device is illustrated and indicated generally at 10A. The propelling track means 16A of this embodiment is formed by an endless section of reinforced belt-like rubber or similar material entrained around the sprockets 40 and 42 and driven by the sprocket 40. However, as shown more clearly in FIG. 9, the endless track 16A includes a plurality of integral equally spaced-apart transverse lugs 104 and 106 on opposing side surfaces of the belt for respectively engaging the teeth of the sprockets 40 and 42 and the surface of the earth or snow thereon. In this embodiment the wheels 60A and pairs of rollers 72A and 73A are provided with notched peripheries cooperatingly nesting the respective lugs 104. Obviously these wheels 60A, rollers 72A and 73A, as well as the sprockets 40 and 42, may be formed in drum fashion to extend transversely coextensive with the track 16A for more efficient cooperative engagement with the lugs 104 and driving the track 16A.

A trailer-like wheel supported cart 108, having a seat 110 replaces the skis 94 and is connected to the device 10A by a tongue 112 so that the device 10A may be used for transporting an operator across the surface of the earth in golf cart fashion.

OPERATION

In operation the engine 14 is started and the device 10 pulls the operator when mounted on the skis in response to advancing the throttle 88. The cleats 36 of the endless track 16 engages the snow, not shown, to provide thrust and propell the operator on the skis. The center of gravity of the device 10 is toward its rearward end portion and approximately at the position of the wheels 60 so that a lateral movement of the handle 86 pivots the device 10 about its center of gravity so that the forward end portion of the device will be turned in a desired direction.

Operation of the alternative device 10A is substantially identical to that described hereinabove. Obviously the device 10A may be used for towing a skier instead of the cart 108.

Obviously the invention is susceptible to changes or alterations without defeating its practicability, therefore, I do not wish to be confined to the preferred embodiment shown in the drawings and described herein.

I claim:
1. An endless track vehicle, comprising:
an elongated frame;
a transverse axle journalled by the respective end portions of said frame;
a sprocket coaxially secured to each said axle;
an engine mounted on said frame and drivably connected with one said axle;
an endless propelling track entrained around said sprockets;
a pair of oppositely disposed inwardly projecting stub axles connected with the sides of said frame intermediate its ends;
a pair of wheels coaxially journalled by said pair of stub axles,
    said pair of wheels contacting the inner surface of said endless track and supporting said frame;
a pair of track tensioning means supported by said frame forwardly of said pair of wheels;
each said track tensioning means comprising:
    two pairs of transversely aligned strap iron members pivotally connected, at one end portion, in longitudinal aligned relation to said frame;
    said pairs of strap iron members projecting downwardly beyond the lowermost limit of said frame in diverging relation;
    a roller journalled between the respective pair of said strap iron members in contact with said track;

a tension spring extending between and connected with said pair of strap iron members; and stop means limiting movement of said pair of strap iron members toward each other;

handle control means connected with and extending beyond one end of said frame; and, rider supporting means towed by said vehicle in trailer-like fashion.

2. Structure as specified in claim 1 in which said endless track comprises:

a pair of parallel laterally spaced-apart endless belts; and, a plurality of channel shaped cleats transversely secured to the outwardly disposed surface of said belts in equally spaced relation.

References Cited

UNITED STATES PATENTS

| | | | |
|---|---|---|---|
| 2,162,198 | 6/1939 | Herrington | 305—27 |
| 2,289,768 | 7/1952 | Fehrenbacher | 180—5 |
| 2,528,890 | 11/1950 | Lawrence | 180—5 |
| 3,175,633 | 3/1965 | Goulet | 180—5 |

FOREIGN PATENTS

| | | | |
|---|---|---|---|
| 1,042,943 | 9/1966 | Great Britain | 180—5 |

RICHARD J. JOHNSON, Primary Examiner

U.S. Cl. X.R.

189—9.22